US012026939B2

(12) United States Patent
Terven et al.

(10) Patent No.: US 12,026,939 B2
(45) Date of Patent: Jul. 2, 2024

(54) AUTO-ANNOTATING OBJECTS USING THERMAL IMAGING

(71) Applicant: AiFi Inc., Burlingame, CA (US)

(72) Inventors: Juan Terven, Santa Clara, CA (US);
Hector Sanchez, Santa Clara, CA (US);
Ying Zheng, Santa Clara, CA (US)

(73) Assignee: AiFi Inc., Burlingame, CA (US)

( * ) Notice: Subject to any disclaimer, the term of this patent is extended or adjusted under 35 U.S.C. 154(b) by 373 days.

(21) Appl. No.: 17/402,542

(22) Filed: Aug. 15, 2021

(65) Prior Publication Data
US 2023/0049087 A1 Feb. 16, 2023

(51) Int. Cl.
| G06V 20/00 | (2022.01) |
| G06V 10/22 | (2022.01) |
| G06V 20/52 | (2022.01) |
| G06V 20/90 | (2022.01) |
| H04N 5/33 | (2023.01) |
| H04N 23/13 | (2023.01) |

(52) U.S. Cl.
CPC ............. *G06V 20/00* (2022.01); *G06V 10/22* (2022.01); *G06V 20/52* (2022.01); *G06V 20/90* (2022.01); *H04N 5/33* (2013.01); *H04N 23/13* (2023.01)

(58) Field of Classification Search
CPC ..... H04W 16/28; H04W 88/08; H04W 40/04; H04W 24/04; H04W 16/24
See application file for complete search history.

(56) References Cited

U.S. PATENT DOCUMENTS

| 10,691,943 B1 * | 6/2020 | Ferstl | G06V 20/13 |
| 2022/0230443 A1 * | 7/2022 | Hua | G06V 10/757 |
| 2023/0008297 A1 * | 1/2023 | Lyu | G06V 40/168 |

* cited by examiner

*Primary Examiner* — Margaret G Mastrodonato
(74) *Attorney, Agent, or Firm* — SQUIRE PATTON BOGGS (US) LLP

(57) ABSTRACT

This application relates to systems, methods, devices, and other techniques for methods of auto-annotating objects using thermal imaging.

3 Claims, 3 Drawing Sheets

---

Synchronizing system time for a first set of thermal cameras and a second set of RGB cameras 305

Calibrating the first set of thermal cameras and the second set of RGB cameras by finding intrinsic parameters and extrinsic parameters of the first set of thermal cameras and the second set of RGB cameras, wherein the intrinsic parameter comprises focal length, center point, and distortion, wherein the extrinsic parameters comprise position and orientation of the RGB cameras and thermal cameras in a 3-D space with respect to a reference point 310 changing an object's temperature to a pre-determined temperature, wherein the pre-determined temperature is determined by a set of factors, wherein the set of factors comprises the object's characteristics, sensitivity of the first set of thermal cameras, cost of changing to the pre-determined temperature 315

Identifying the object with a first set of coordinates in the first set of thermal cameras by color filtering 320

Identifying the object with a second set of coordinates in the second set of RGB cameras 325

Mapping the first coordinates of the objects from the first set of thermal cameras to the second coordinates of the objects of the second set of RGB cameras 330

Annotating a bounding box, a segmentation mask and a category label on RGB images 335

300

Synchronizing system time for a first set of thermal cameras and a second set of RGB cameras 205

↓

Calibrating the first set of thermal cameras and the second set of RGB cameras by finding intrinsic parameters and extrinsic parameters of the first set of thermal cameras and the second set of RGB cameras, wherein the intrinsic parameter comprises focal length, center point, and distortion, wherein the extrinsic parameters comprise position and orientation of the RGB cameras and thermal cameras in a 3-D space with respect to a reference point 210

↓ cooling an object to a pre-determined temperature 215

↓

Identifying the object with a first set of coordinates in the first set of thermal cameras by color filtering 220

↓

Identifying the object with a second set of coordinates in the second set of RGB cameras 225

↓

Mapping the first coordinates of the objects from the first set of thermal cameras to the second coordinates of the objects of the second set of RGB cameras 230

↓

Annotating a bounding box, a segmentation mask and a category label on RGB images 235

Synchronizing system time for a first set of thermal cameras and a second set of RGB cameras 305

↓

Calibrating the first set of thermal cameras and the second set of RGB cameras by finding intrinsic parameters and extrinsic parameters of the first set of thermal cameras and the second set of RGB cameras, wherein the intrinsic parameter comprises focal length, center point, and distortion, wherein the extrinsic parameters comprise position and orientation of the RGB cameras and thermal cameras in a 3-D space with respect to a reference point 310

↓ changing an object's temperature to a pre-determined temperature, wherein the pre-determined temperature is determined by a set of factors, wherein the set of factors comprises the object's characteristics, sensitivity of the first set of thermal cameras, cost of changing to the pre-determined temperature 315

↓

Identifying the object with a first set of coordinates in the first set of thermal cameras by color filtering 320

↓

Identifying the object with a second set of coordinates in the second set of RGB cameras 325

↓

Mapping the first coordinates of the objects from the first set of thermal cameras to the second coordinates of the objects of the second set of RGB cameras 330

↓

Annotating a bounding box, a segmentation mask and a category label on RGB images 335

AUTO-ANNOTATING OBJECTS USING THERMAL IMAGING

BACKGROUND OF THE INVENTION

This application relates to systems, methods, devices, and other techniques that can be utilized for auto-annotating objects using thermal imaging Methods and apparatus to generate models for testing and training neural networks in a retail store to monitor products and customers are in practice. However, generating models by auto-annotating objects using thermal imaging within a retail environment is new. Furthermore, these techniques and methods can be combined with recently developed AI and machine learning and make the purchase process more accurate and efficient.

Therefore, it is desirable to have new systems, methods, devices, and other techniques to generate models by auto-annotating objects using thermal imaging.

SUMMARY OF THE INVENTION

In some embodiments, the invention is related to a method for auto-annotating objects using thermal imaging in a retail store.

In some embodiments, the method comprises a step of synchronizing system time for a first set of thermal cameras and a second set of RGB cameras.

In some embodiments, the method comprises a step of calibrating the first set of thermal cameras and the second set of RGB cameras by finding intrinsic parameters and extrinsic parameters of the first set of thermal cameras and the second set of RGB cameras, wherein the intrinsic parameter comprises focal length, center point, and distortion, wherein the extrinsic parameters comprise position and orientation of the RGB cameras and thermal cameras in a 3-D space with respect to a reference point.

In some embodiments, the method comprises a step of heating up an object to a pre-determined temperature.

In some embodiments, the method comprises a step of identifying the object with a first set of coordinates in the first set of thermal cameras by color filtering.

In some embodiments, the method comprises a step of identifying the object with a second set of coordinates in the second set of RGB cameras.

In some embodiments, the method comprises a step of mapping the first coordinates of the objects from the first set of thermal cameras to the second coordinates of the objects of the second set of RGB cameras.

In some embodiments, the method comprises a step of annotating a bounding box, a segmentation mask and a category label on RGB images.

In some embodiments, the invention is related to a method for auto-annotating objects using thermal imaging in a retail store.

In some embodiments, the method comprises a step of synchronizing system time for a first set of thermal cameras and a second set of RGB cameras.

In some embodiments, the method comprises a step of calibrating the first set of thermal cameras and the second set of RGB cameras by finding intrinsic parameters and extrinsic parameters of the first set of thermal cameras and the second set of RGB cameras, wherein the intrinsic parameter comprises focal length, center point, and distortion, wherein the extrinsic parameters comprise position and orientation of the RGB cameras and thermal cameras in a 3-D space with respect to a reference point.

In some embodiments, the method comprises a step of cooling an object to a pre-determined temperature.

In some embodiments, the method comprises a step of identifying the object with a first set of coordinates in the first set of thermal cameras by color filtering.

In some embodiments, the method comprises a step of identifying the object with a second set of coordinates in the second set of RGB cameras.

In some embodiments, the method comprises a step of mapping the first coordinates of the objects from the first set of thermal cameras to the second coordinates of the objects of the second set of RGB cameras.

In some embodiments, the method comprises a step of annotating a bounding box, a segmentation mask and a category label on RGB images.

In some embodiments, the invention is related to a method for auto-annotating objects using thermal imaging in a retail store.

In some embodiments, the method comprises a step of synchronizing system time for a first set of thermal cameras and a second set of RGB cameras.

In some embodiments, the method comprises a step of calibrating the first set of thermal cameras and the second set of RGB cameras by finding intrinsic parameters and extrinsic parameters of the first set of thermal cameras and the second set of RGB cameras, wherein the intrinsic parameter comprises focal length, center point, and distortion, wherein the extrinsic parameters comprise position and orientation of the RGB cameras and thermal cameras in a 3-D space with respect to a reference point.

In some embodiments, the method comprises a step of changing an object's temperature to a pre-determined temperature, wherein the pre-determined temperature is determined by a set of factors, wherein the set of factors comprises the object's characteristics, sensitivity of the first set of thermal cameras, cost of changing to the pre-determined temperature.

In some embodiments, the method comprises a step of identifying the object with a first set of coordinates in the first set of thermal cameras by color filtering.

In some embodiments, the method comprises a step of identifying the object with a second set of coordinates in the second set of RGB cameras.

In some embodiments, the method comprises a step of mapping the first coordinates of the objects from the first set of thermal cameras to the second coordinates of the objects of the second set of RGB cameras.

In some embodiments, the method comprises a step of annotating a bounding box, a segmentation mask and a category label on RGB images.

These and other aspects, their implementations and other features are described in detail in the drawings, the description and the claims.

BRIEF DESCRIPTION OF THE DRAWINGS

FIG. 2 shows another example of a method of auto-annotating objects using thermal imaging in a retail store.

FIG. 3 shows a third example of a method of auto-annotating objects using thermal imaging in a retail store.

DETAILED DESCRIPTION OF THE INVENTION

Figure 1:
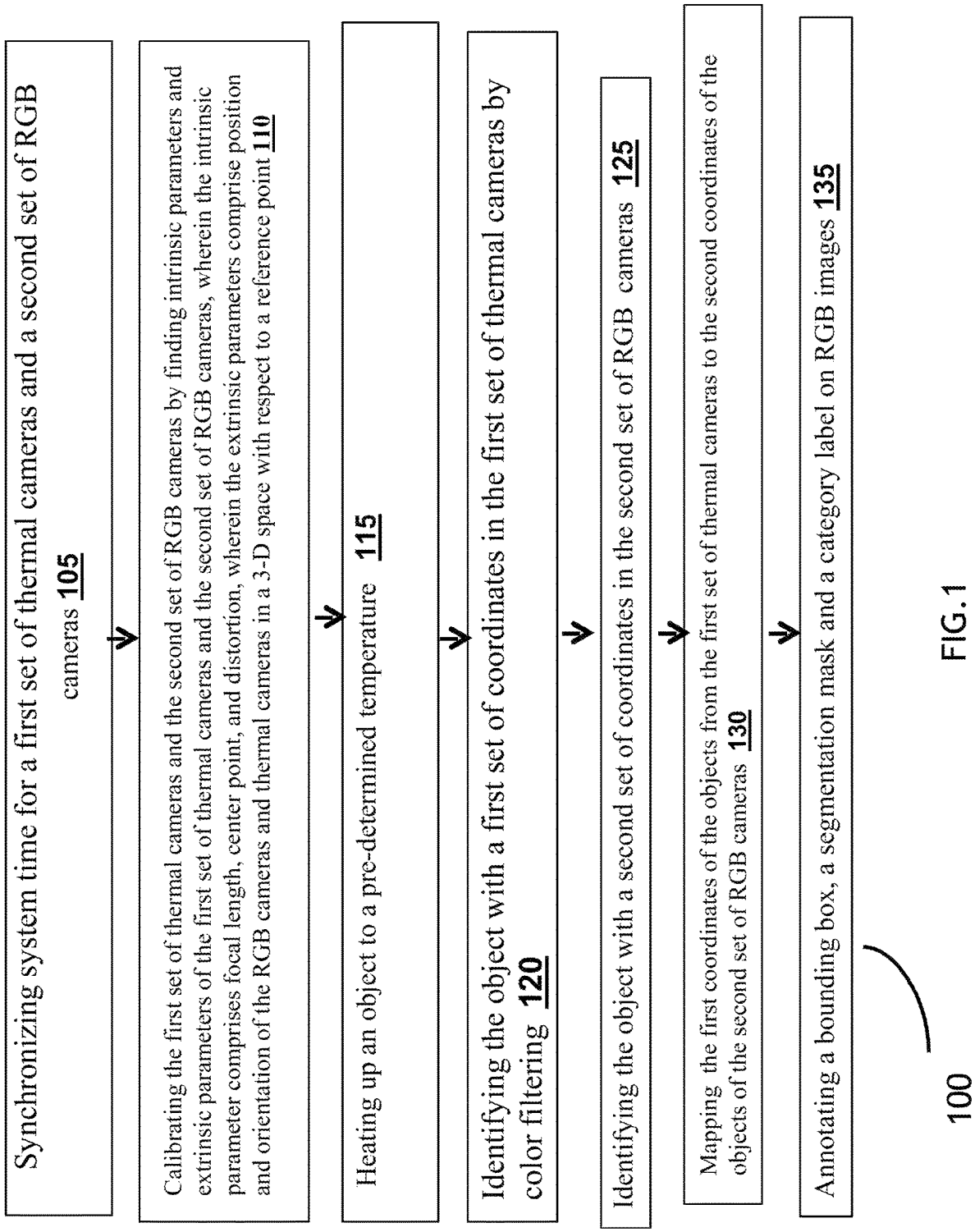
FIG. 1 shows an example of a method of auto-annotating objects using thermal imaging in a retail store.

FIG. 1 shows an example of a method 100 of auto-annotating objects using thermal imaging in a retail store.

In some embodiments, the method comprises a step 105 of synchronizing system time for a first set of thermal cameras and a second set of RGB cameras.

In some embodiments, the method comprises a step 110 of calibrating the first set of thermal cameras and the second set of RGB cameras by finding intrinsic parameters and extrinsic parameters of the first set of thermal cameras and the second set of RGB cameras, wherein the intrinsic parameter comprises focal length, center point, and distortion, wherein the extrinsic parameters comprise position and orientation of the RGB cameras and thermal cameras in a 3-D space with respect to a reference point.

In some embodiments, the method comprises a step 115 of heating up an object to a pre-determined temperature.

In some embodiments, the method comprises a step 120 of identifying the object with a first set of coordinates in the first set of thermal cameras by color filtering.

In some embodiments, the method comprises a step 125 of identifying the object with a second set of coordinates in the second set of RGB cameras.

In some embodiments, the method comprises a step 130 of mapping the first coordinates of the objects from the first set of thermal cameras to the second coordinates of the objects of the second set of RGB cameras.

In some embodiments, the method comprises a step 135 of annotating a bounding box, a segmentation mask and a category label on RGB images.

FIG. 2 shows another example of a method 200 of auto-annotating objects using thermal imaging in a retail store.

In some embodiments, the method comprises a step 205 of synchronizing system time for a first set of thermal cameras and a second set of RGB cameras.

In some embodiments, the method comprises a step 210 of calibrating the first set of thermal cameras and the second set of RGB cameras by finding intrinsic parameters and extrinsic parameters of the first set of thermal cameras and the second set of RGB cameras, wherein the intrinsic parameter comprises focal length, center point, and distortion, wherein the extrinsic parameters comprise position and orientation of the RGB cameras and thermal cameras in a 3-D space with respect to a reference point.

In some embodiments, the method comprises a step 215 of cooling an object to a pre-determined temperature.

In some embodiments, the method comprises a step 220 of identifying the object with a first set of coordinates in the first set of thermal cameras by color filtering.

In some embodiments, the method comprises a step 225 of identifying the object with a second set of coordinates in the second set of RGB cameras.

In some embodiments, the method comprises a step 230 of mapping the first coordinates of the objects from the first set of thermal cameras to the second coordinates of the objects of the second set of RGB cameras.

In some embodiments, the method comprises a step 235 of annotating a bounding box, a segmentation mask and a category label on RGB images.

FIG. 3 shows a third example of a method 300 of auto-annotating objects using thermal imaging in a retail store.

In some embodiments, the method comprises a step 305 of synchronizing system time for a first set of thermal cameras and a second set of RGB cameras.

In some embodiments, the method comprises a step 310 of calibrating the first set of thermal cameras and the second set of RGB cameras by finding intrinsic parameters and extrinsic parameters of the first set of thermal cameras and the second set of RGB cameras, wherein the intrinsic parameter comprises focal length, center point, and distortion, wherein the extrinsic parameters comprise position and orientation of the RGB cameras and thermal cameras in a 3-D space with respect to a reference point.

In some embodiments, the method comprises a step 315 of changing an object's temperature to a pre-determined temperature, wherein the pre-determined temperature is determined by a set, of factors, wherein the set of factors comprises the object's characteristics, sensitivity of the first set of thermal cameras, cost of changing to the pre-determined temperature.

In some embodiments, the method comprises a step 320 of identifying the object with a first set of coordinates in the first set of thermal cameras by color filtering.

In some embodiments, the method comprises a step 325 of identifying the object with a second set of coordinates in the second set of RGB cameras.

In some embodiments, the method comprises a step 330 of mapping the first coordinates of the objects from the first set of thermal cameras to the second coordinates of the objects of the second set of RGB cameras.

In some embodiments, the method comprises a step 335 of annotating a bounding box, a segmentation mask and a category label on RGB images.

The invention claimed is:

1. A method for auto-annotating objects using thermal imaging in a retail store, comprising:
  synchronizing system time for a first set of thermal cameras and a second set of RGB cameras;
  calibrating the first set of thermal cameras and the second set of RGB cameras by finding intrinsic parameters and extrinsic parameters of the first set of thermal cameras and the second set of RGB cameras, wherein the intrinsic parameters comprise focal length, center point, and distortion, wherein the extrinsic parameters comprise position and orientation of the RGB cameras and thermal cameras in a 3-D space with respect to a reference point;
  heating up an object to a pre-determined temperature, wherein the pre-determined temperature is determined by a set of factors, wherein the set of factors comprises the object's characteristics, sensitivity of the first set of thermal cameras, cost of changing to the pre-determined temperature;
  identifying the object with a first set of coordinates in the first set of thermal cameras by color filtering;
  identifying the object with a second set of coordinates in the second set of RGB cameras;
  mapping the first coordinates of the objects from the first set of thermal cameras to the second coordinates of the objects of the second set of RGB cameras; and
  annotating a bounding box, a segmentation mask and a category label on RGB images.

2. A method for auto-annotating objects using thermal imaging in a retail store, comprising:
  synchronizing system time for a first set of thermal cameras and a second set of RGB cameras;
  calibrating the first set of thermal cameras and the second set of RGB cameras by finding intrinsic parameters and extrinsic parameters of the first set of thermal cameras and the second set of RGB cameras, wherein the intrinsic parameters comprise focal length, center point, and distortion, wherein the extrinsic parameters comprise position and orientation of the RGB cameras and thermal cameras in a 3-D space with respect to a reference point;

cooling an object to a pre-determined temperature, wherein the pre-determined temperature is determined by a set of factors, wherein the set of factors comprises the object's characteristics, sensitivity of the first set of thermal cameras, cost of changing to the pre-determined temperature;

identifying the object with a first set of coordinates in the first set of thermal cameras by color filtering;

identifying the object with a second set of coordinates in the second set of RGB cameras;

mapping the first coordinates of the objects from the first set of thermal cameras to the second coordinates of the objects of the second set of RGB cameras; and annotating a bounding box, a segmentation mask and a category label on RGB images.

3. A method for auto-annotating objects using thermal imaging in a retail store, comprising:

synchronizing system time for a first set of thermal cameras and a second set of RGB cameras;

calibrating the first set of thermal cameras and the second set of RGB cameras by finding intrinsic parameters and extrinsic parameters of the first set of thermal cameras and the second set of RGB cameras, wherein the intrinsic parameters comprise focal length, center point, and distortion, wherein the extrinsic parameters comprise position and orientation of the RGB cameras and thermal cameras in a 3-D space with respect to a reference point;

changing an object's temperature to a pre-determined temperature, wherein the pre-determined temperature is determined by a set of factors, wherein the set of factors comprises the object's characteristics, sensitivity of the first set of thermal cameras, cost of changing to the pre-determined temperature;

identifying the object with a first set of coordinates in the first set of thermal cameras by color filtering;

identifying the object with a second set of coordinates in the second set of RGB cameras;

mapping the first coordinates of the objects from the first set of thermal cameras to the second coordinates of the objects of the second set of RGB cameras; and annotating a bounding box, a segmentation mask and a category label on RGB images.

* * * * *